United States Patent Office 3,337,353
Patented Aug. 22, 1967

3,337,353
MgO-B$_2$O$_3$ FUSED CAST REFRACTORY
Allen M. Alper and Robert N. McNally, Corning, N.Y., assignors to Corhart Refractories Company, Inc., Louisville, Ky., a corporation of Delaware
No Drawing. Filed Jan. 25, 1966, Ser. No. 522,833
4 Claims. (Cl. 106—58)

ABSTRACT OF THE DISCLOSURE

Basic fused cast refractory having MgO and B$_2$O$_3$ as the principal essential constituents, and composed of periclase as the major crystal phase and magnesium orthoborate as a minor crystal phase. Composition consists of, analytically by weight, 1 to 20% B$_2$O$_3$, 0 to 15% FeO, 0 to 5% SiO$_2$, 0 to 3% of Al$_2$O$_3$, Cr$_2$O$_3$ and mixtures thereof, and the balance being MgO in an amount of at least 80% plus other incidental impurities. Refractory suitable for use in basic oxygen steelmaking furnaces and processes. Higher strength when B$_2$O$_3$ is 2 to 8%, FeO is 0 to 5%, SiO$_2$ is 0 to 1% and MgO is at least 92%. Lower permanent growth with FeO not more than 1%.

---

The very corrosive high lime-to-silica ratio ferruginous slags employed in the basic oxygen steelmaking furnaces and processes are one of the principal factors that have greatly limited the useful service life of refractories employed heretofore for working linings in such furnaces, especially the common commercial refractories such as tar-bonded dolomites, tar-impregnated magnesites, and fused cast and bonded magnesite-chrome ore mixtures. As a result, operators of these steelmaking furnaces have been seeking refractories for the working linings that are much more capable of withstanding these highly corrosive and erosive environments for longer periods of time so as to reduce one of the principal costs in the steelmaking operation and to provide greater efficiency in furnace operation.

It is an object of this invention to provide a novel basic fused cast refractory that possesses a corrosion-erosion resistance in basic oxygen steelmaking environments greatly superior to that of the common commercial refractories used heretofore.

It is another object of this invention to provide a novel basic fused cast refractory that possesses a high degree of thermal shock resistance for withstanding the thermal stresses developed in refractory linings of steelmaking furnaces and the like.

It is a further object of a preferred form of this invention (as noted below) to provide a novel basic fused cast refractory that exhibits very low permanent growth when subjected to fluctuations in temperature as are commonly experienced in the heat-to-heat operation of steelmaking furnaces. Low permanent growth insures greater structural stability and integrity of the refractory over longer periods of time.

It is a still further object of a preferred form of this invention (as noted below) to provide a novel basic fused cast refractory that exhibits very high strength.

The basic fused cast refractory according to this invention broadly consists of, analytically by weight, 1 to 20% B$_2$O$_3$, 0 to 15% FeO, 0 to 5% SiO$_2$, 0 to 3% of Al$_2$O$_3$, Cr$_2$O$_3$ and mixtures thereof, and the balance being MgO in an amount of at least 80% plus other incidental impurities. The MgO and B$_2$O$_3$ are the main essential constituents and can be employed alone when a particular application warrants the expense of very high purity raw materials. The FeO and SiO$_2$ in the amounts specified above give satisfactory properties while providing greater ease in melting of the batch materials. Minor additions of Al$_2$O$_3$ and/or Cr$_2$O$_3$ are permissible up to a total of 3% by weight and can be advantageous for providing some improvement in corrosion-erosion resistance.

An especially desirable fused cast refractory according to this invention that exhibits very high strength consists of, analytically by weight 2 to 8% B$_2$O$_3$, 0 to 5% FeO, 0 to 1% SiO$_2$, 0 to 3% of Al$_2$O$_3$, Cr$_2$O$_3$ and mixtures thereof, and the balance being MgO in an amount of at least 92% plus other incidental impurities. The lower FeO and SiO$_2$ contents provide distinctly higher resistance to corrosion-erosion by high lime ferruginous slags.

For low permanent growth characteristics, the composition in the preceding paragraph should be modified by limiting the FeO content to a maximum of 1%. Generally, amounts of 0.1 to 1% each of FeO and SiO$_2$ are beneficial in manufacturing good saleable products.

Other incidental impurities are merely those extremely minor contaminants, besides the oxides mentioned above, resulting from the ordinary impurity contents of good grades of raw materials for MgO, B$_2$O$_3$, etc. (e.g., CaO impurity in commercially pure magnesia) and amount to a total of less than 1% by weight of the fused cast refractory.

The crystal structure of the fused cast refractory of this invention is composed of essentially randomly oriented crystals of periclase (which is the major crystal phase) and of magnesium borate, Mg$_3$(BO$_3$)$_2$.

As is conventional in the art of fused cast refractories manufacture is readily done by melting a mixture of appropriate raw materials, for example, commercially pure calcined magnesia and anhydrous boric oxide. Because of the relatively high temperatures (e.g., approx. 2000–2800° C.) that have to be generated for melting these compositions, conventional electric arc melting furnaces well known for this purpose are preferably employed. The raw batch materials are suitably proportioned to provide the desired final composition and preferably are premixed in granular form prior to charging into the melting furnace. After melting a sufficient amount of material, the molten mass is usually poured into preformed molds of suitable material (e.g., graphite, bonded sand, etc.) and allowed to cool and solidify therein to form a monolithic block or casting according to common practice as is illustrated in United States Patent 1,615,750. Of course, the mold can also be the furnace container in which the melting is done, in which case the pouring step is omitted and the molten contents are allowed to solidify in that container. The mold may be larger to form a billet from which several bricks or block products can be cut.

By way of illustrating and providing a better appreciation of the present invention, the following detailed description and data are given concerning refractory samples of the invention and of prior refractories, and their properties or characteristics.

The table below shows batch mixture (in weight percent) that were melted in an electric arc furnace and corresponding chemical compositions (in weight percent) of the solidified blocks as calculated from the analyses of the oxide materials entering into the batch mixtures. Examples 1 and 2 illustrate the present invention and Example 3 is a refractory outside this invention because of the detrimentally high B$_2$O$_3$ content. The calcined magnesia employed had the following typical analysis, by weight: 98.51% MgO, 0.22% Fe$_2$O$_3$, 0.28% SiO$_2$, 0.86% CaO, 0.13% loss on ignition. The boric oxide was anhydrous material containing 98.9% by weight B$_2$O$_3$.

The precent slag cut data shows the resistance to high lime-to-silica ratio ferruginous slag by the several examples and is based upon the test comprising placing 1½″ x 1″ x ½″ samples in a furnace having a CO atmosphere adapted to approximate a basic oxygen vessel environment. At 1700° C. for about 2½ to 3 hours, the samples were passed, with one of their largest surfaces facing upward, through a downwardly directed stream of molten basic slag droplets at a substantially uniform rate of 60 times per hour until 2 kilograms of slag has been employed. The slag was representative of basic oxygen vessel slag developed during the production of a heat of steel and had the following composition by weight: 23.75% Fe₂O₃, 25.94% SiO₂, 40.86% CaO, 6.25% MgO and 3.20% Al₂O₃. At the end of the test, the thickness of the samples in the area corroded-eroded by the slag is measured and compared with the original ½″ thickness prior to testing. The results are expressed as a percentage change in thickness called "percent slag cut."

TABLE I

| Example No. | 1 | 2 | 3 |
|---|---|---|---|
| Calcined Magnesia | 95% | 85% | 75% |
| Boric Oxide | 5% | 5% | 25% |
| MgO | 93.75 | 83.97 | 74.17 |
| B₂O₃ | 4.95 | 14.87 | 24.82 |
| FeO | 0.21 | 0.19 | 0.16 |
| SiO₂ | 0.27 | 0.24 | 0.21 |
| CaO | 0.82 | 0.73 | 0.64 |
| Percent Slag Cut | 22 | 11 | 38 & 100 |
| T. S. Cycles | | 8 | 4 |
| Percent Linear Change in Length | +0.08 | +1.44 | −1.35 |
| | +0.08 | +1.60 | +1.30 |
| | +0.12 | +2.01 | −0.67 |
| M.O.R. (p.s.i.) at R.T. | 10,800 | 3,060 | 4,200 |

It will be noted that an unduly high B₂O₃ content causes poor slag corrosion-erosion resistance. Similar poor results in the same test procedure were found for several prior refractory products. Tar-bonded dolomite samples exhibited percent slag cuts of 100 (i.e., completely cut into two pieces). Tar-impregnated magnesite samples exhibited slag cuts of 70–100%. Slag cuts of 40–100% were found on samples of fused cast refractory made from a mixture of 55% by weight calcined magnesia and 45% by weight Transvaal chrome ore. A sample made from grain resulting from crushing the latter fused cast refractory and rebonding the grain by pressing and sintering at about 1600° C. yielded a slag cut of 100%. Hence, the greatly improved slag corrosion-erosion resistance of the present invention is readily apparent.

The thermal shock resistance data (T.S. cycles) was determined by a rigorous test in which 1″ x 1″ x 3″ samples at room temperature are put into a furnace preheated to 1400° C., held in the furnace for 10 minutes to allow the samples to become uniformly heated, then pulled out into the air and held there for 10 minutes so that the samples become substantially cooled to room temperature. The procedure constitutes one cycle of the test and it is repeated until the samples failed by fracturing or spalling into two or more pieces, at which time the total number of cycles performed are noted. In the case of Example 2, the test was discontinued after 8 cycles with no evidence of fracturing or spalling. In contrast thereto, Example 3 was able to withstand only 4 cycles and samples of the above noted 55% magnesia-45% chrome ore fused cast refractory were able to withstand only 2–3 cycles in this test.

The permanent growth data (expressed as percent linear change in length) was determined by twelve heating and cooling cycles, of which one cycle consists of heating 1½″ x ½″ x ¼″ samples to 1400° C. and then cooling them to about room temperature. The length of each sample after the test is compared with the original length and the results are expressed in terms of linear percentage change in length.

The very high strength afforded with the present invention is especially notable by the modulus of rupture (M.O.R.) value of 10,800 p.s.i. for Example No. 1. While the strength values for the other two examples are not as high, they still indicate reasonably good strength. The modulus of rupture values were determined by conventional flexure test at room temperature.

We claim:
1. A fused cast refractory consisting of, analytically by weight, 1 to 20% B₂O₃, 0 to 15% FeO, 0 to 5% SiO₂, 0 to 3% of Al₂O₃, Cr₂O₃ and mixtures thereof, and the balance being MgO in an amount of at least 80% plus other incidental impurities.
2. The fused cast refractory of claim 1 wherein the B₂O₃ is 2 to 8%, the FeO is 0 to 5%, the SiO₂ is 0 to 1% and the MgO is at least 92%.
3. The fused cast refractory of claim 2 wherein the FeO is 0 to 1%.
4. The fused cast refractory of claim 2 wherein the FeO is 0.1 to 1% and the SiO₂ is 0.1 to 1%.

References Cited

Davis et al.: The System Magnesium Oxide-Boric Oxide, J. Am. Cer. Soc., vol. 28, 1945, pp. 97–102.

TOBIAS E. LEVOW, *Primary Examiner.*

J. E. POER, *Assistant Examiner.*